(12) United States Patent
Chen

(10) Patent No.: US 9,904,159 B2
(45) Date of Patent: Feb. 27, 2018

(54) ILLUMINATION SYSTEM

(71) Applicant: DELTA ELECTRONICS, INC., Taoyuan Hsien (TW)

(72) Inventor: Ching-Liang Chen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 523 days.

(21) Appl. No.: 14/609,685

(22) Filed: Jan. 30, 2015

(65) Prior Publication Data

US 2016/0004149 A1 Jan. 7, 2016

(30) Foreign Application Priority Data

Jul. 4, 2014 (TW) .............................. 103123086 A

(51) Int. Cl.
| | |
|---|---|
| *F21V 29/10* | (2015.01) |
| *G03B 21/20* | (2006.01) |
| *G02B 7/182* | (2006.01) |
| *H04N 9/31* | (2006.01) |
| *G02B 27/10* | (2006.01) |
| *G02B 27/14* | (2006.01) |

(52) U.S. Cl.
CPC ....... *G03B 21/2046* (2013.01); *G02B 7/1822* (2013.01); *G02B 27/108* (2013.01); *G02B 27/14* (2013.01); *G03B 21/2013* (2013.01); *G03B 21/2066* (2013.01); *H04N 9/3164* (2013.01)

(58) Field of Classification Search
CPC .......................... G02B 21/2046; G02B 7/1822
See application file for complete search history.

(56) References Cited

U.S. PATENT DOCUMENTS 6,943,925 B1 * 9/2005 Islam ................... G02B 6/3516
359/108
2003/0095318 A1 5/2003 DiCarlo et al.
(Continued)

FOREIGN PATENT DOCUMENTS

| CN | 102414599 A | 4/2012 |
|---|---|---|
| JP | 2012133337 A | 7/2012 |

(Continued)

*Primary Examiner* — Robert May
*Assistant Examiner* — Leah S Macchiarolo
(74) *Attorney, Agent, or Firm* — Kirton McConkie; Evan R. Witt

(57) ABSTRACT

An illumination system includes a first light source module and a first reflective mirror module. The first light source module includes plural first light sources for emitting plural first light beams, respectively. The first reflective mirror module includes at least one first reflective mirror, at least one first fixing structure, and at least one first adjusting mechanism. The first reflective mirror is located at a first optical axis of the plural first light sources. The at least one first fixing structure is used for fixing the first reflective mirror. The first adjusting mechanism is connected with the first fixing structure. By moving or rotating the first adjusting mechanism, a location and an angle of the first reflective mirror relative to the first optical axis are correspondingly changed, so that the first light beam is reflected by the first reflective mirror and guided along a specified optical path.

10 Claims, 9 Drawing Sheets

(56) References Cited

U.S. PATENT DOCUMENTS

| | | | |
|---|---|---|---|
| 2005/0219493 A1* | 10/2005 | Oshida | G02B 19/0014 355/67 |
| 2009/0153752 A1 | 6/2009 | Silverstein | |
| 2012/0133903 A1 | 5/2012 | Tanaka | |

FOREIGN PATENT DOCUMENTS

| | | | |
|---|---|---|---|
| JP | 2012525681 A | 10/2012 | |
| JP | 2012215634 A | 11/2012 | |
| JP | 2014154214 A | 8/2014 | |

* cited by examiner

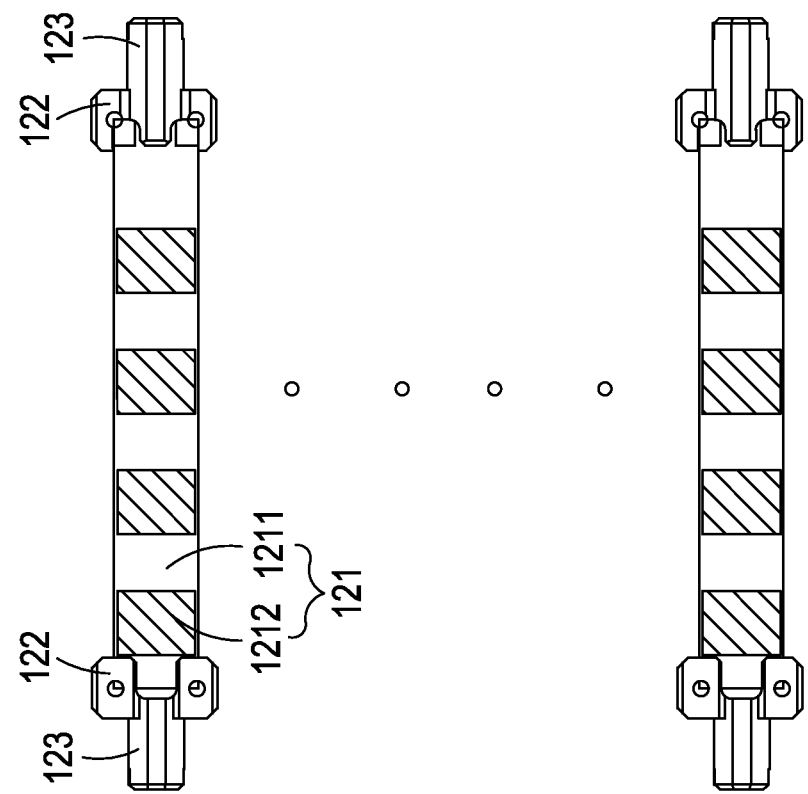

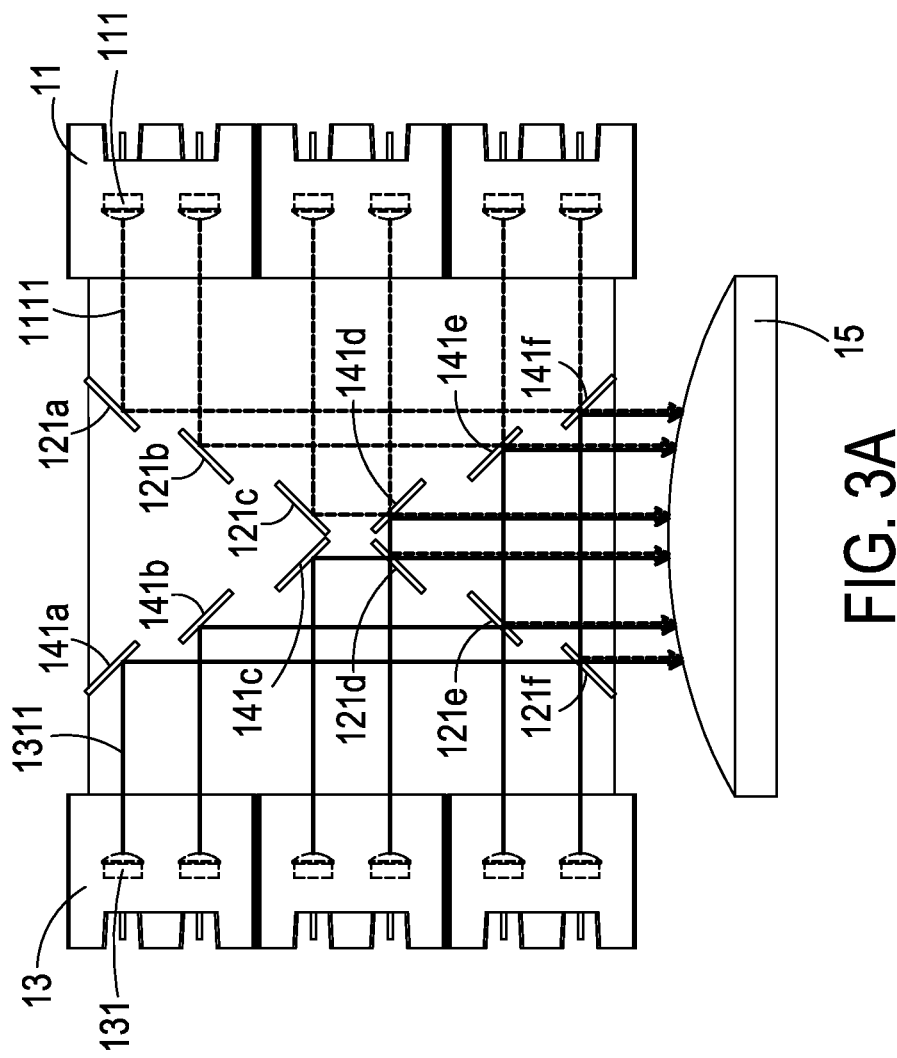

US 9,904,159 B2

ILLUMINATION SYSTEM

FIELD OF THE INVENTION

The present invention relates to an illumination system, and more particularly to an illumination system having an adjusting mechanism for adjusting a reflective mirror module.

BACKGROUND OF THE INVENTION

In recent years, a variety of projectors have been widely used in various video applications. For example, projectors can be used for making presentations, holding meetings or giving lectures in classrooms, boardrooms, conference rooms or home theaters. By the projector, an image signal from an image signal source can be enlarged and shown on a projection screen. For reducing power loss and overall volume and increasing the image quality, the illumination system of the current projector employs a solid-state light-emitting element (e.g. light emitting diode or laser diode) to replace the conventional high intensity discharge (HID) lamp or ultra-high pressure (UHP) mercury lamp.

Generally, for increasing the total light amount, plural solid-state light-emitting elements of the conventional illumination system are arranged in an array. Moreover, plural reflective mirrors are aligned with the optical axis of the array of the solid-state light-emitting elements. The light beams from the array of the solid-state light-emitting elements are reflected by the reflective mirrors and guided to the same focusing lens. After the light beams are focused by the focusing lens, the focused light beams are guided to an imaging system.

However, due to the assembly tolerance of the light-emitting elements and the reflective mirrors or the characteristics of the light-emitting elements (e.g. the beam angle), the light beams reflected by the reflective mirrors cannot be effectively centralized and guided to the same focusing lens. Moreover, since no proper adjusting mechanism can be used to adjust the reflective mirrors, the above drawbacks fail to be overcome. Under this circumstance, the power loss is increased, and the utilization efficiency of the illumination system is deteriorated. Moreover, since the intensity of the light beams introduced into the projection device is insufficient, the image quality and the luminance are adversely affected. Since the reflected light beams are not propagated along the specified optical path, the temperature of the illumination system is increased.

Therefore, there is a need of providing an improved illumination system in order to overcome the above drawbacks.

SUMMARY OF THE INVENTION

An object of the present invention provides an illumination system. The illumination system comprises a light source, a reflective mirror, a fixing structure, and an adjusting mechanism. By the adjusting mechanism, the location and the angle of the reflective mirror relative to the optical axis of the light source is adjusted. Consequently, the light beam reflected by the reflective mirror can be effectively guided to the focusing element. Consequently, the performance of the illumination system is enhanced, and the power loss and overheated problem from the assembling error are minimized.

Another object of the present invention provides an illumination system for increasing the imaging quality and luminance of a projection device.

In accordance with an aspect of the present invention, there is provided an illumination system for a projection device. The illumination system includes a first light source module and a first reflective mirror module. The first light source module includes plural first light sources for emitting plural first light beams, respectively. The first reflective mirror module includes at least one first reflective mirror, at least one first fixing structure, and at least one first adjusting mechanism. The first reflective mirror is located at a first optical axis of the plural first light sources. The at least one first fixing structure is used for fixing the first reflective mirror. The first adjusting mechanism is connected with the first fixing structure. By moving or rotating the first adjusting mechanism, a location and an angle of the first reflective mirror relative to the first optical axis are correspondingly changed, so that the first light beam is reflected by the first reflective mirror and guided along a specified optical path.

In accordance with another aspect of the present invention, there is provided an illumination system for a projection device. The illumination system includes a light source, a reflective mirror, a fixing structure, and an adjusting mechanism. The light source emits a light beam. The reflective mirror is located at an optical axis of the light source. The fixing structure is used for fixing the reflective mirror. The adjusting mechanism is connected with the fixing structure. By moving or rotating the adjusting mechanism, a location and an angle of the reflective mirror relative to the optical axis are correspondingly changed, so that the light beam is reflected by the reflective mirror and guided along a specified optical path.

The above contents of the present invention will become more readily apparent to those ordinarily skilled in the art after reviewing the following detailed description and accompanying drawings, in which:

BRIEF DESCRIPTION OF THE DRAWINGS

FIG. 2 schematically illustrates a first reflective mirror module of the illumination system according to the first embodiment of the present invention;

FIGS. 3A and 3B schematically illustrate the optical paths of the light beams of the illumination system according to the first embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
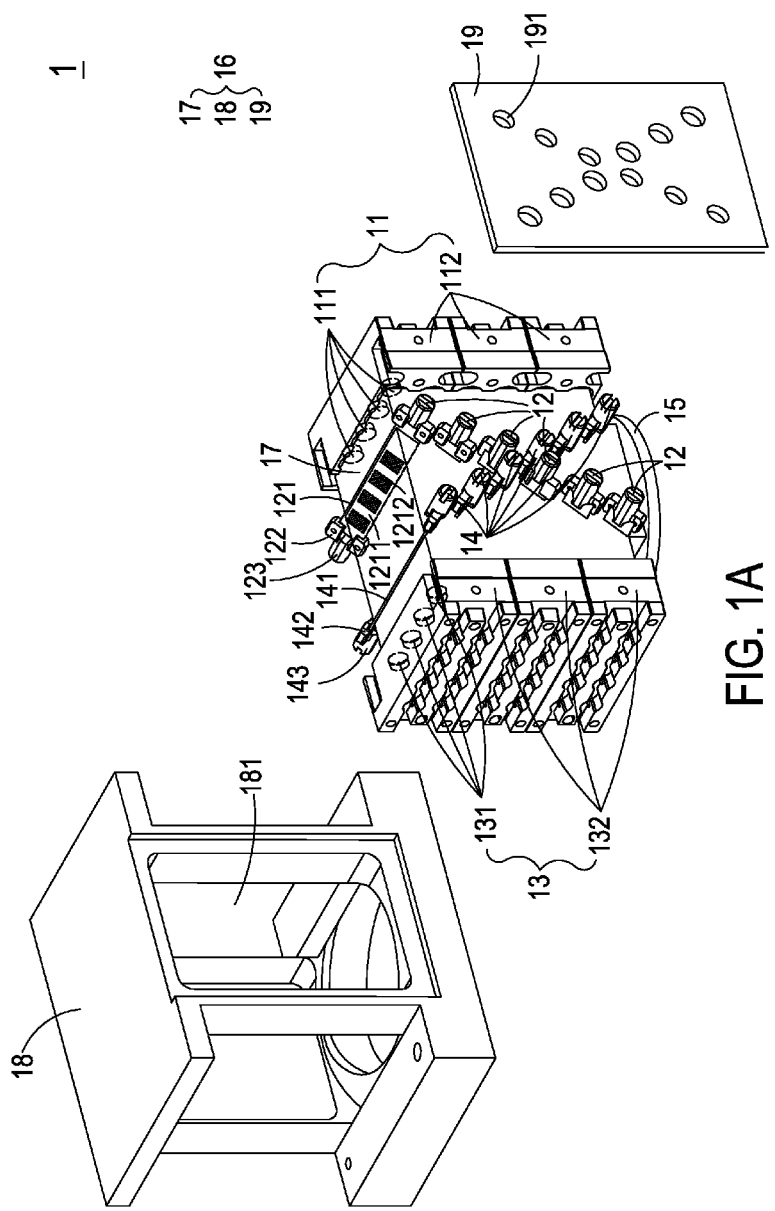
FIG. 1A is a schematic exploded view illustrating an illumination system according to a first embodiment of the present invention.
Figure 1B:
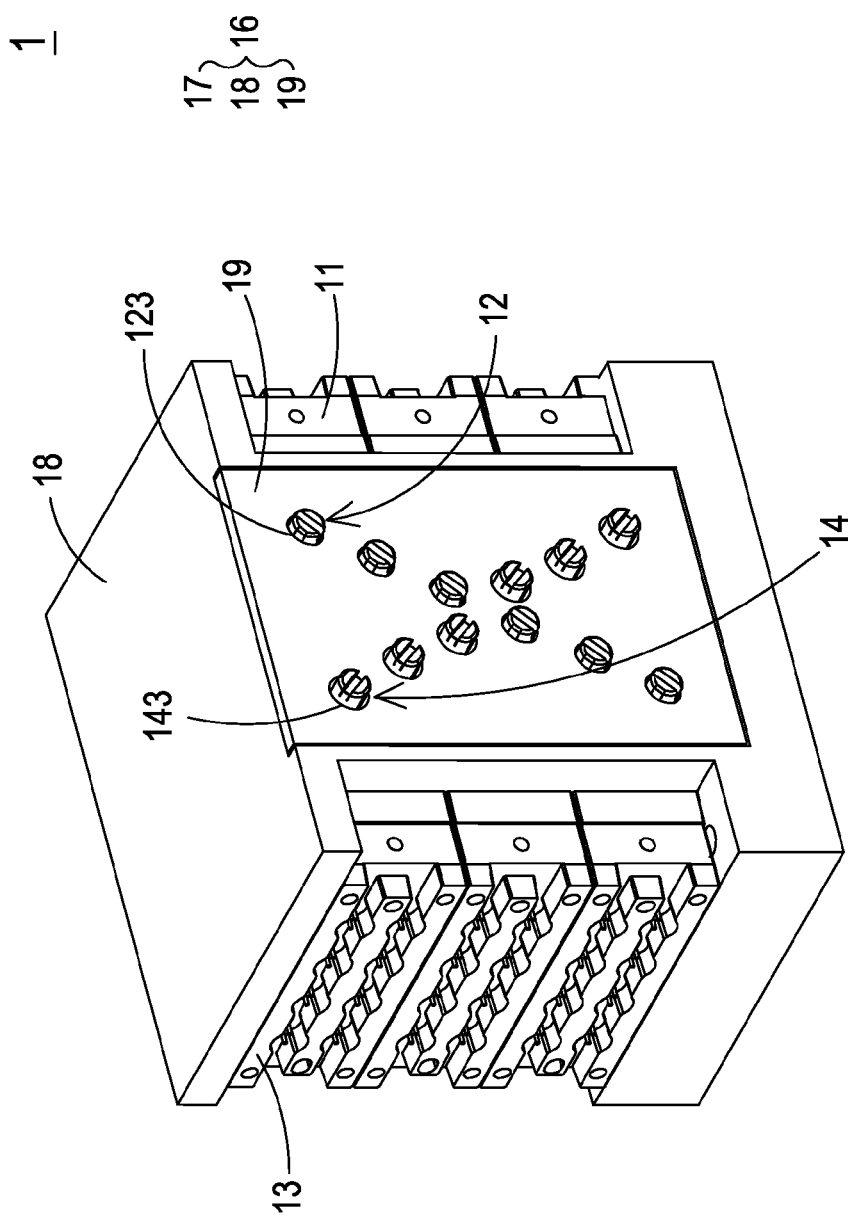
FIG. 1B is a schematic assembled view of the illumination system of FIG. 1A.
Figure 3B:
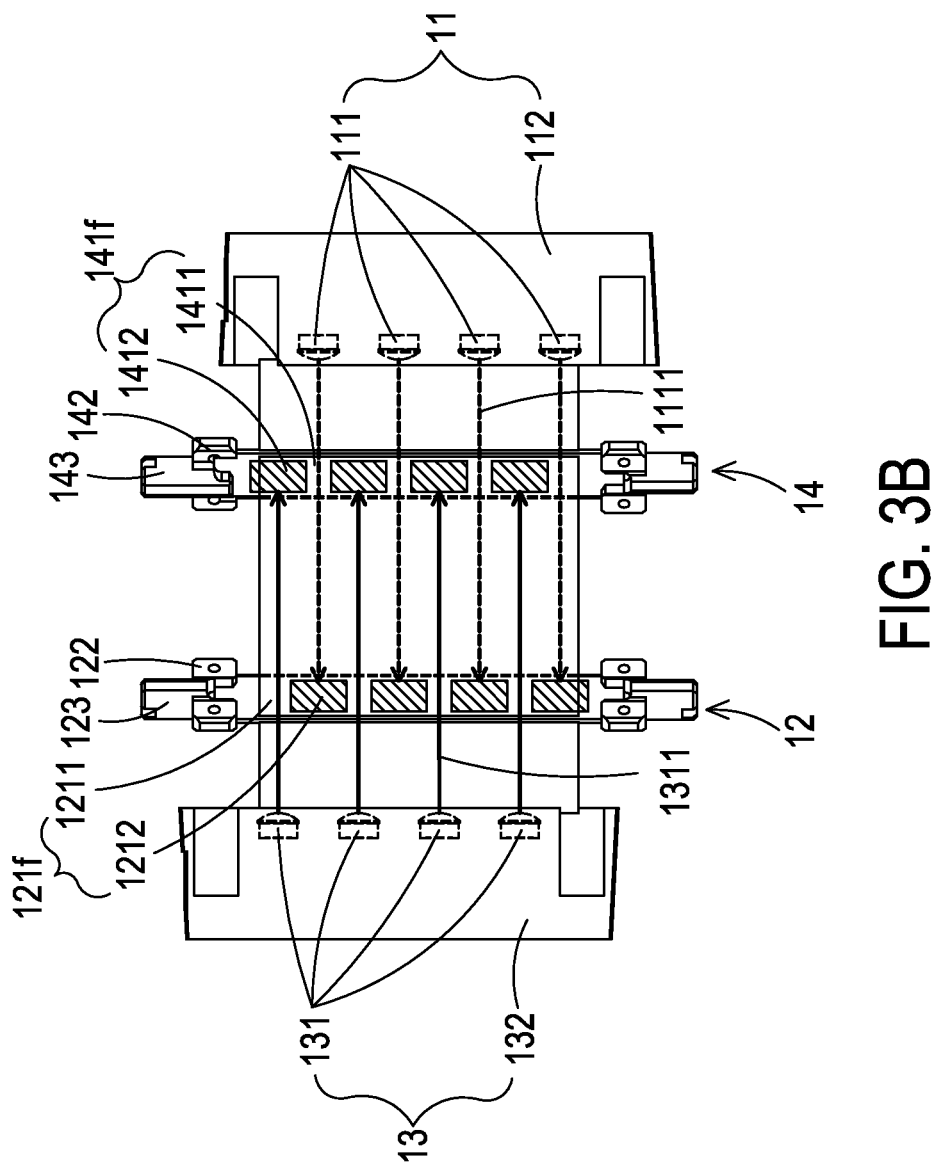

Please refer to FIG. 1A, FIG. 1B, FIG. 2, FIG. 3A and FIG. 3B. FIG. 1A is a schematic exploded view illustrating an illumination system according to a first embodiment of the present invention. FIG. 1B is a schematic assembled view of the illumination system of FIG. 1A. FIG. 2 schematically illustrates a first reflective mirror module of the illumination system according to the first embodiment of the present invention. FIGS. 3A and 3B schematically illustrate the optical paths of the light beams of the illumination system according to the first embodiment of the present invention.

The illumination system 1 of the present invention is applied to a projection device. An example of the projection device includes but is not limited to a digital light processing (DLP) projector or a liquid crystal display (LCD) projector. In this embodiment, the illumination system 1 comprises a first light source module 11, a first reflective mirror module 12, and a covering member 16. The first light source module 11 is exposed outside the covering member 16, and located at a first side of the covering member 16. The first reflective mirror module 12 is at least partially disposed within the covering member 16. The first light source module 11 comprises one or more first light sources 111. Each first light source 111 emits a first light beam 1111. The first reflective mirror module 12 comprises at least one first reflective mirror 121, at least one first fixing structure 122, and at least one first adjusting mechanism 123. The first reflective mirror 121 is disposed within the covering member 16 and aligned with an optical axis (not shown) of the first light source 111. The first fixing structure 122 is used for fixing the first reflective mirror 121. The first adjusting mechanism 123 is partially protruded outside the covering member 16 and connected with the first fixing structure 122. The first fixing structure 122 is synchronously moved or rotated with the first adjusting mechanism 123. That is, by moving or rotating the first adjusting mechanism 123, the location and the angle of the first reflective mirror 121 relative to the optical axis of the first light source 111 are correspondingly changed. Consequently, the first light beam 1111 is reflected by the first reflective mirror 121 and guided to a focusing element 15 along a specified optical path.

In this embodiment, the first light source module 11 comprises plural first light sources 111. Each of the plural first light sources 111 emits the first light beam 1111. An example of the first light source 111 includes but is not limited to a light emitting diode or laser diode. Moreover, the plural first light sources 111 are arranged in a planar array. As shown in FIG. 1A, twenty-four first light sources 111 of the first light source module 11 are arranged in a planar array of four columns and six rows. It is noted that the number and arrangement of the first light sources 111 may be varied according to the practical requirements. Moreover, the first light source module 11 further comprises one or more first bases 112 for fixing and accommodating the plural first light sources 111. In this embodiment, the first light source module 11 comprises three first bases 112. The three first bases 112 are stacked on each other, and located at a side of the covering member 16. In particular, eight first light sources 111 are arranged in an array of four columns and two rows, and fixed and accommodated by each first base 112. Consequently, the first light beams 1111 from the first light source module 11 are directed to the first reflective mirror module 12 in the same incidence manner.

In this embodiment, the first reflective mirror module 12 comprises plural first reflective mirrors 121, plural first fixing structures 122, and plural adjusting mechanisms 123. Each first reflective mirror 121 is located at the optical paths of the corresponding first light sources 111 for reflecting the corresponding first light beams 1111. Consequently, the plural first light beams 1111 are guided to a focusing element 15. In this embodiment, the number of the first reflective mirrors 121 of the first reflective mirror module 12 is equal to the number of the rows of the first light sources 111 of the first light source module 11. For example, as shown in FIG. 1A, the first reflective mirror module 12 comprises six first reflective mirrors 121. The six first reflective mirrors 121 are located at the optical axes of the six rows of first light sources 111, respectively. In this embodiment, the first reflective mirrors 121 are rectangular, and these first reflective mirrors 121 are in parallel with each other. Consequently, the plural first light beams 1111 reflected by the first reflective mirrors 121 will not interfere with each other. It is noted that the number, arrangement and shape of the first reflective mirrors 121 may be varied according to the practical requirements.

Please refer to FIG. 1A, FIG. 1B, FIG. 2, FIG. 3A and FIG. 3B again. Moreover, each first reflective mirror 121 comprises at least one transmissible zone 1211 and at least one reflective zone 1212. In this embodiment, each first reflective mirror 121 comprises four transmissible zones 1211 and four reflective zones 1212, which are alternately arranged. The transmissible zones 1211 are light-transmissible. The reflective zones 1212 may reflect light beams. For example, the reflective zones 1212 are produced by a metal sputtering process. In this embodiment, the four reflective zones 1212 are aligned with the optical axel of the corresponding first light sources 111 of the first light source module 11. Consequently, the first light beams 1111 from the first light sources 111 are reflected by the reflective zones 1212 of the corresponding first reflective mirrors 121 and guided to the focusing element 15.

In this embodiment, the covering member 16 comprises a carrier 17, a frame 18, and a lateral plate 19. The frame 18 comprises an accommodation space 181 for accommodating the carrier 17. The carrier 17 is used for supporting the first reflective mirror module 12. The first reflective mirrors 121 of the first reflective mirror module 12 are disposed within the carrier 17. The first fixing structures 122 and the first adjusting mechanisms 123 are located outside the carrier 17. The first light source module 11 is fixedly located at a side of the carrier 17. The lateral plate 19 is disposed on the frame 18. Moreover, the lateral plate 19 comprises plural perforations 191. The first adjusting mechanisms 123 are penetrated through the perforations 191, so that the first adjusting mechanisms 123 are partially exposed to the outer surface of the lateral plate 19 to be adjusted by the user.

The first fixing structures 122 are used for fixing and supporting the first reflective mirrors 121 by a clamping means, an adhering means, a screwing means or an engaging means. As shown in FIG. 2, the two ends of each first reflective mirror 121 are clamped by two first fixing structures 122.

The first adjusting mechanism 123 is connected with the first fixing structure 122. The first adjusting mechanism 123 is penetrated through the corresponding perforation 191 of the lateral plate 19 of the covering member 16, so that the first adjusting mechanism 123 is partially exposed to the outer surface of the covering member 16. The first adjusting mechanism 123 is interference-fitted in the corresponding perforation 191 of the lateral plate 19. As known, if the first light source module 11 or the first reflective mirror module 12 has a design error or an assembling error, some problems may occur. For example, if the first reflective mirror 121 is shifted or the reflective zone 1212 is deviated from the optical axis of the first light source 111, the optical path of guiding the reflected first light beam 1111 to the focusing element 15 is deviated. Under this circumstance, the first light beam 1111 cannot be effectively focused by the focusing element 15. For solving the problems, the user may rotate or move the first adjusting mechanism 123 to adjust the location and the angle of the first reflective mirror 121 relative to the optical axis of the first light source 111.

It is noted that the way of adjusting the first reflective mirror 121 by the first adjusting mechanism 123 is not restricted. In another embodiment, the first adjusting mechanism 123 comprises a packing screw (not shown), a screw hole (not shown), and a spring (not shown). The screw hole is formed in the first fixing structure 122. The spring is disposed within the screw hole and sheathed around the packing screw. If the first light source module 11 or the first reflective mirror module 12 has a design error or an assembling error, the user may change the relative position between the packing screw and the screw hole or rotate the packing screw in order to adjust the location and the angle of the first reflective mirror 121 relative to the optical axis of the first light source 111. When the relative position between the packing screw and the screw hole is changed, the spring is correspondingly compressed or loosened. After the location and the angle of the first reflective mirror 121 relative to the optical axis of the first light source 111 are adjusted by moving or rotating the first adjusting mechanism 123, the reflective zones 1212 of the first reflective mirror 121 can be aligned with the corresponding first light sources 111 of the first light source module 11 and the first light beam 111 can be effectively guided along the optical path to the focusing element 15.

Please refer to FIG. 1A, FIG. 1B, FIG. 2, FIG. 3A and FIG. 3B again. In this embodiment, the illumination system 1 further comprises a second light source module 13 and a second reflective mirror module 14. The second light source module 13 is exposed outside the covering member 16, and located at a second side of the covering member 16. The second reflective mirror module 14 is at least partially disposed within the covering member 16. The first light source module 11 and the second light source module 13 are located at opposite sides of the covering member 16. The second light source module 13 comprises one or more second light sources 131 and one or more second bases 132. Each second light source 131 emits a second light beam 1311. The second reflective mirror module 14 comprises at least one second reflective mirror 141, at least one second fixing structure 142, and at least one second adjusting mechanism 143. The second fixing structure 142 is used for fixing the second reflective mirror 141. The second reflective mirror 141 is aligned with an optical axis (not shown) of the corresponding second light source 131 for reflecting the corresponding second light beam 1311. Moreover, each second reflective mirror 141 comprises at least one transmissible zone 1411 and at least one reflective zone 1412. In this embodiment, each second reflective mirror 141 comprises four transmissible zones 1411 and four reflective zones 1412, which are alternately arranged. In this embodiment, the four reflective zones 1212 are aligned with the optical axel of the corresponding second light sources 131 of the second light source module 13. The structures and functions of the second light source module 13 and the second reflective mirror module 14 are similar to those of the first light source module 11 and the first reflective mirror module 12, and are not redundantly described herein.

Please refer to FIGS. 3A and 3B again. The three first reflective mirrors 121a, 121b and 121c are farther from the focusing element 15 than the three first reflective mirrors 121d, 121e and 121f. The three second reflective mirrors 141a, 141b and 141c are farther from the focusing element 15 than the three second reflective mirrors 141d, 141e and 141f. The reflective zones 1212 of the three first reflective mirrors 121a, 121b and 121c are aligned with the corresponding first light sources 111. Consequently, the first light beams 1111 from the corresponding first light sources 111 are reflected by the reflective zones 1212 of the three first reflective mirrors 121a, 121b and 121c and guided to the focusing element 15. Similarly, the reflective zones 1412 of the three second reflective mirrors 141a, 141b and 141c are aligned with the corresponding second light sources 131. Consequently, the second light beams 1311 from the corresponding second light sources 131 are reflected by the reflective zones 1412 of the three second reflective mirrors 141a, 141b and 141c and guided to the focusing element 15.

On the other hand, the reflective zones 1212 of the three first reflective mirrors 121d, 121e and 121f and aligned with corresponding transmissible zones 1411 of the three second reflective mirrors 141d, 141e and 141f and the corresponding first light sources 111. Consequently, the first light beams 1111 from the corresponding first light sources 111 are transmitted through the transmissible zones 1411 of the three second reflective mirrors 141d, 141e and 141f, reflected by the reflective zones 1212 of the three first reflective mirrors 121d, 121e and 121f and guided to the focusing element 15. Similarly, the reflective zones 1212 of the three second reflective mirrors 141d, 141e and 141f and aligned with corresponding transmissible zones 1211 of the three first reflective mirrors 121d, 121e and 121f and the corresponding second light sources 131. Consequently, the second light beams 1311 from the corresponding second light sources 131 are transmitted through the transmissible zones 1211 of the three second reflective mirrors 121d, 121e and 121f, reflected by the reflective zones 1412 of the three second reflective mirrors 141d, 141e and 141f and guided to the focusing element 15. Since the structures and arrangements of the first light source module 11, the first reflective mirror module 12, the second light source module 13 and the second reflective mirror module 14 are specially designed, the optical paths of the light beams will not interfere with each other. Consequently, space utilization is enhanced, and the volume of the illumination system is reduced.

Figure 4A:
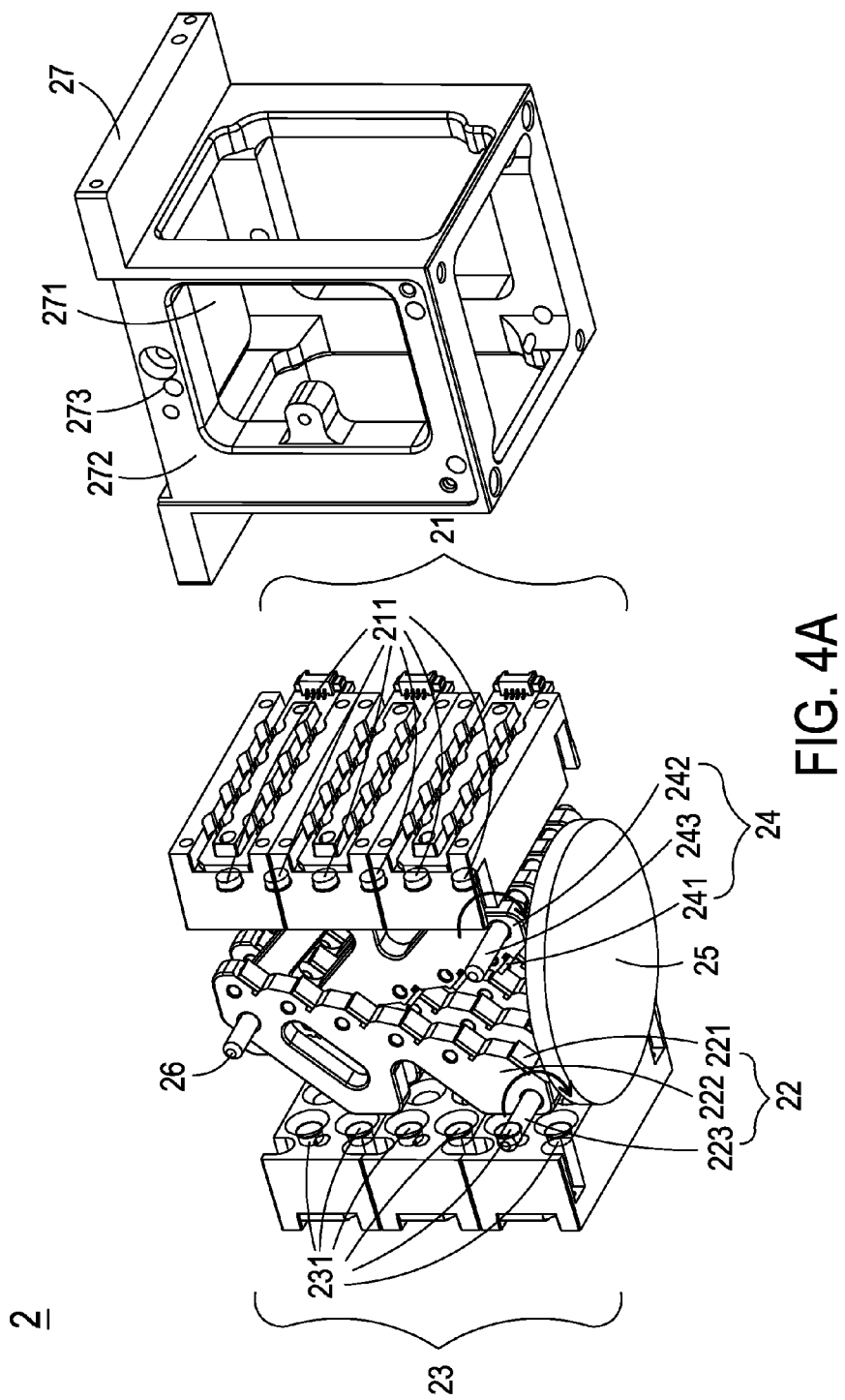
FIG. 4A is a schematic exploded view illustrating an illumination system according to a second embodiment of the present invention.
Figure 4B:
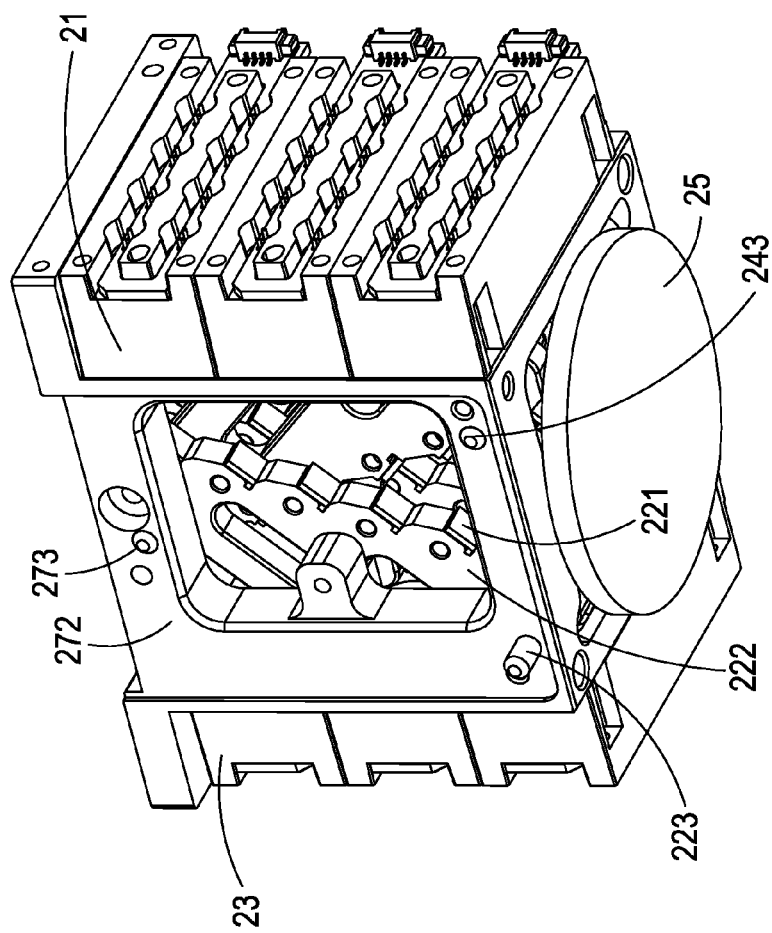
FIG. 4B is a schematic assembled view of the illumination system of FIG. 4A.
Figure 5:
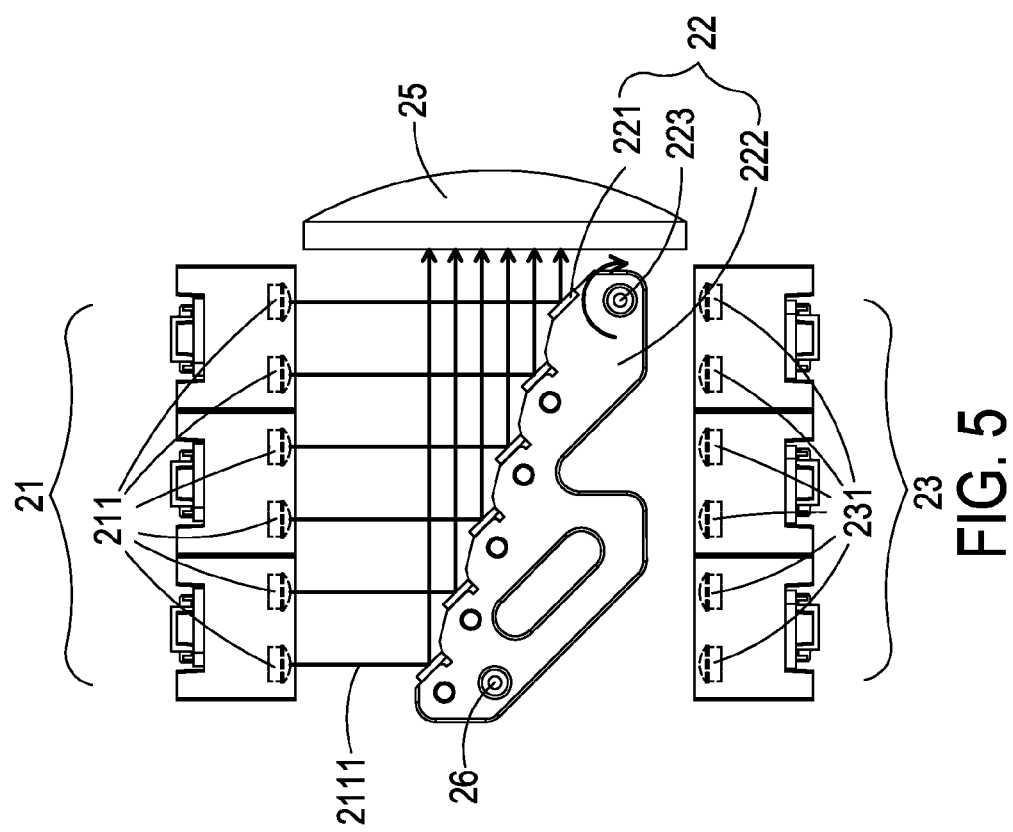
FIG. 5 schematically illustrates the optical paths of the light beams of the illumination system according to the second embodiment of the present invention.
Figure 6:
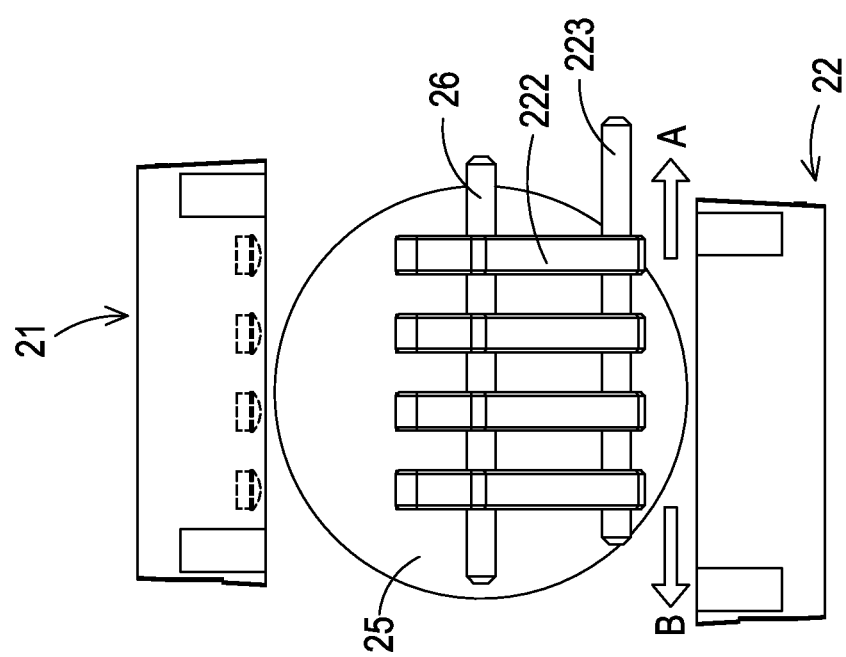
FIG. 6 schematically illustrates an approach of adjusting the first reflective mirror by the first adjusting mechanism according to the second embodiment of the present invention.

Please refer to FIG. 4A, FIG. 4B, FIG. 5 and FIG. 6. FIG. 4A is a schematic exploded view illustrating an illumination system according to a second embodiment of the present invention. FIG. 4B is a schematic assembled view of the illumination system of FIG. 4A. FIG. 5 schematically illustrates the optical paths of the light beams of the illumination system according to the second embodiment of the present invention. FIG. 6 schematically illustrates an approach of adjusting the first reflective mirror by the first adjusting mechanism according to the second embodiment of the present invention.

In this embodiment, the illumination system 2 comprises a first light source module 21, a first reflective mirror module 22, and a covering member 27. The first light source module 21 is exposed outside the covering member 27, and located at a first side of the covering member 27. The first reflective mirror module 22 is disposed with an accommodation space 271 of the covering member 27. The first light source module 21 comprises one or more first light sources 211. Each first light source 211 emits a first light beam 2111. The number and arrangement of the first light sources 211 of the first light source module 21 are similar to those of the first embodiment, and are not redundantly described herein.

The first reflective mirror module 22 comprises at least one first reflective mirror 221, at least one first fixing structure 222, and at least one first adjusting mechanism 223. The first reflective mirror 221 is aligned with an optical axis (not shown) of the corresponding first light source 211 for reflecting the corresponding first light beam 2111. Consequently, the first light beam 2111 is reflected by the first reflective mirror 221 and guided to a focusing element 25. The first fixing structure 222 is used for fixing the first reflective mirror 221 by a clamping means, an adhering means, a screwing means or an engaging means. In this embodiment, the number of the first fixing structures 222 is equal to the column number of the first light sources 211 of the first light source module 21. For example, as shown in FIG. 4A, the first reflective mirror module 22 comprises four first fixing structures 222. The four first fixing structures 222 are in parallel with four columns of first light sources 211. Moreover, plural first reflective mirrors 221 are discretely disposed on each first fixing structure 222 in a stepped arrangement. Consequently, the plural first light beams 2111 reflected by the first reflective mirrors 221 will not interfere with each other. For example, twenty-four first light sources 211 of the first light source module 21 are arranged in a planar array of four columns and six rows. That is, six first light sources 211 in each column are separated from each other at the same spacing interval, and six first reflective mirrors 221 are discretely disposed on each first fixing structure 222 in a stepped arrangement. In particular, the optical axes of the six first light sources 211 in the same column are aligned with the six first reflective mirrors 221, respectively. Consequently, the first light beams 2111 are reflected by the corresponding first reflective mirror 221 and guided to the focusing element 25.

The first adjusting mechanism 223 is connected with the first fixing structure 222. In some embodiments, the first adjusting mechanism 223 is penetrated through the first fixing structure 222 and connected with the first fixing structure 222. By moving or rotating the first adjusting mechanism 223, the location and the angle of the first reflective mirror 221 relative to the optical axis of the first light source 211 are correspondingly changed. Consequently, the first light beam 2111 is reflected by the first reflective mirror 221 and guided to the focusing element 25 along a specified optical path. In this embodiment, the first adjusting mechanism 223 is an adjusting lever, but is not limited thereto. The first fixing structure 222 has a pivotal hole corresponding to the adjusting lever 223. The diameter of the pivotal hole is slightly larger than the diameter of the adjusting lever 223. For assembling the first reflective mirror module 22, the first reflective mirrors 221 are aligned with the optical axes of the corresponding first light sources 211, and the first adjusting mechanisms 223 are penetrated through corresponding pivotal holes of the corresponding first fixing structure 222.

As known, if the first light source module 21 or the first reflective mirror module 22 has a design error or an assembling error, some problems may occur. For example, if the first reflective mirror 221 is shifted or the reflective zone 2212 is deviated from the optical axis of the first light source 211, the optical path of guiding the reflected first light beam 2111 to the focusing element 25 is deviated. Under this circumstance, the first light beam 2111 cannot be effectively focused by the focusing element 25. For solving these problems, the user may rotate or move the first adjusting mechanism 223 to adjust the location and the angle of the first reflective mirror 221 relative to the optical axis of the first light source 211.

Please refer to FIG. 5. By rotating the first adjusting mechanism 223, the angle of the first reflective mirror 221 relative to the optical axis of the first light source 211 is adjusted. Consequently, the first light beam 2111 reflected by the first reflective mirror 221 can be effectively guided to the focusing element 25. Please refer to FIG. 6. By moving the first adjusting mechanism 223 in the direction A or the direction B, the location of the first reflective mirror 221 relative to the optical axis of the first light source 211 is adjusted. In other words, the location and the angle of the first reflective mirror 221 relative to the optical axis of the first light source 211 may be adjusted through the first adjusting mechanism 223 according to the practical requirements. After adjustment, the first light beam 2111 reflected by the first reflective mirror 221 can be effectively guided to the focusing element 25. Under this circumstance, the performance of the illumination system 2 is enhanced, and the power loss and overheated problem from the assembling error are minimized.

Please refer to FIG. 4A, FIG. 4B, FIG. 5 and FIG. 6 again. In this embodiment, the illumination system 2 further comprises a second light source module 23 and a second reflective mirror module 24. The second light source module 23 is exposed outside the covering member 27, and located at a second side of the covering member 27. The first light source module 21 and the second light source module 23 are located at opposite sides of the covering member 27. The second light source module 23 comprises one or more second light sources 231. Each second light source 231 emits a second light beam (not shown). For avoiding interference between the second light beams and the first light beams, the second light sources 231 and the first light sources 211 in the same row are staggered. The number and arrangement of the second light sources 231 of the second light source module 23 are similar to those of the first light sources 211 of the first light source module 21, and are not redundantly described herein.

The second reflective mirror module 24 comprises at least one second reflective mirror 241, at least one second fixing structure 242, and at least one second adjusting mechanism 243. The second fixing structure 242 is used for fixing the second reflective mirror 241. The second reflective mirror 241 is aligned with an optical axis (not shown) of the corresponding second light source 231 for reflecting the corresponding second light beam. The second adjusting mechanism 243 is connected with the second fixing structure 242. In some embodiments, the second adjusting mechanism 243 is penetrated through the pivotal hole of the second fixing structure 242 and connected with the second fixing structure 242. The second fixing structure 242 is synchronously moved or rotated with the second adjusting mechanism 243. By moving or rotating the second adjusting mechanism 243, the location and the angle of the second reflective mirror 241 relative to the optical axis of the second light source 231 are correspondingly changed. Consequently, the second light beam is reflected by the second reflective mirror 241 and guided to the focusing element 25 along a specified optical path. The structures and functions of the second light source module 23 and the second reflective mirror module 24 are similar to those of the first light source module 21 and the first reflective mirror module 22, and are not redundantly described herein.

In this embodiment, the illumination system 2 comprises plural first fixing structures 222 and plural second fixing structures 242. The number of the first fixing structures 222 is equal to the column number of the first light sources 211 of the first light source module 21, and the number of the second fixing structures 242 is equal to the column number of the second light sources 213 of the second light source module 23. As shown in FIG. 4A, the four first fixing structures 222 are aligned with the corresponding columns of the first light sources 211, and the four second fixing structures 242 are aligned with the corresponding columns of the second light sources 213. Consequently, the first light beams 2111 are reflected by the corresponding first reflective mirrors 221 and guided to the focusing element 25, and the second light beams are reflected by the corresponding second reflective mirrors 241 and guided to the focusing element 25. Moreover, the first fixing structures 222 and the second fixing structures 242 are staggered. Since the first fixing structures 222 and the second fixing structures 242 are staggered, the first light beams 2111 and the second light beams will not interfere with each other.

In some embodiments, the covering member 27 further comprises a lateral plate 272. The lateral plate 272 has plural perforations 273. The illumination system 2 further comprises an auxiliary fixing element 26. An example of the auxiliary fixing element 26 includes but is not limited to a fixing rod. The auxiliary fixing element 26 is used for positioning the plural first fixing structures 222 and the plural second fixing structures 242. As shown in FIGS. 4A and 4B, the first adjusting mechanism 223, the second adjusting mechanism 243 and the auxiliary fixing element 26 are penetrated through the corresponding perforations 273 of the lateral plate 272 and exposed to the outer surface of the lateral plate 272. Moreover, each of the plural first fixing structures 222 and the plural second fixing structures 242 comprises a fixing hole. The fixing holes of the plural first fixing structures 222 and the fixing holes of the plural second fixing structures 242 are aligned with each other. After the auxiliary fixing element 26 is penetrated through the fixing holes of the plural first fixing structures 222 and the fixing holes of the plural second fixing structures 242, the plural first fixing structures 222 and the plural second fixing structures 242 are positioned by the auxiliary fixing element 26. Alternatively, the auxiliary fixing element 26 can be extracted from the fixing holes of the plural first fixing structures 222 and the fixing holes of the plural second fixing structures 242, so that the locations and angles of the plural first fixing structures 222 and the plural second fixing structures 242 can be adjusted.

From the above descriptions, the present invention provides an illumination system. The illumination system comprises a light source, a reflective mirror, a fixing structure, and an adjusting mechanism. By the adjusting mechanism, the location and the angle of the reflective mirror relative to the optical axis of the light source is adjusted. Consequently, the light beam reflected by the reflective mirror can be effectively guided to the focusing element. Consequently, the performance of the illumination system 2 is enhanced, and the power loss and overheated problem from the assembling error are minimized.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An illumination system for a projection device, the illumination system comprising:
   a first light source module comprising plural first light sources for emitting plural first light beams, respectively;
   a first reflective mirror module comprising:
      at least one first reflective mirror located at a first optical axis of the plural first light sources;
      at least one first fixing structure for fixing the first reflective mirror and comprises a first fixing hole; and
      at least one first adjusting mechanism connected with the first fixing structure;
   a second light source module opposed to the first light source module, and comprising plural second light sources for emitting plural second light beams, respectively; and
   a second reflective mirror module comprising:
      at least one second reflective mirror located at a second optical axis of the plural second light sources;
      at least one second fixing structure for fixing the second reflective mirror and comprises a second fixing hole;
      at least one second adjusting mechanism connected with the fixing structure; and
      an auxiliary fixing element is penetrated through the first fixing hole of the first fixing structure and the second fixing hole of the second fixing structure for positioning the first fixing structure and the second fixing structure;
   wherein by extracting the auxiliary fixing element from the first fixing hole and the second fixing hole, and moving or rotating the first adjusting mechanism and the second adjusting mechanism, a location and an angle of the first reflective mirror relative to the first optical axis are correspondingly changed, and a location and an angle of the second reflective mirror relative to the second optical axis are also correspondingly changed, so that the first light beam and the second light beam are reflected by the first reflective mirror and the second reflective mirror respectively, and guided along a specified optical path.

2. The illumination system according to claim 1, further comprising a focusing element, wherein after the first light beam is reflected by the first reflective mirror and the second light beam is reflected by the second reflective mirror, the first light beam and the second light beam are guided to the focusing element.

3. The illumination system according to claim 1, wherein each of the plural first light sources and the plural second light sources are arranged in a planar array of M rows and N columns.

4. The illumination system according to claim 3, wherein the at least one first reflective mirror comprises M first reflective mirrors, and the M first reflective mirrors are in parallel with each other, wherein the at least one second reflective mirror comprises M second reflective mirrors, and the M second reflective mirrors are in parallel with each other.

5. The illumination system according to claim 4, wherein the first reflective mirror comprises alternate transmissible zones and reflective zones, and the reflective zones of the first reflective mirror are aligned with the first optical axis, wherein the second reflective mirror comprises alternate transmissible zones and reflective zones, and the reflective zones of the second reflective mirror are aligned with the second optical axis.

6. The illumination system according to claim 3, wherein the at least one first fixing structure comprises N first fixing structures, and the at least one second fixing structure comprises N second fixing structures, wherein the N first fixing structures and the N second fixing structures are staggered.

7. The illumination system according to claim 1, wherein the first reflective mirror is fixed and clamped by the first fixing structure, wherein the second reflective mirror is fixed and clamped by the second fixing structure.

8. The illumination system according to claim 1, further comprising a covering member, wherein the covering member comprises a carrier, a frame and a lateral plate, wherein the frame comprises an accommodation space for accommodating the carrier, the first reflective mirror module and the second reflective mirror module are supported by the carrier, and the lateral plate is disposed on the frame, wherein the lateral plate comprises plural perforations, and the first adjusting mechanism and the second adjusting mechanism are penetrated through the corresponding perforations and partially exposed to an outer surface of the lateral plate.

9. The illumination system according to claim 1, wherein the first fixing structure is synchronously moved or rotated with the first adjusting mechanism, wherein the first adjusting mechanism comprises a first adjusting lever, the first fixing structure comprises a first pivotal hole, and the first adjusting lever is penetrated through the first pivotal hole to be moved or rotated, wherein the second fixing structure is synchronously moved or rotated with the second adjusting mechanism, wherein the second adjusting mechanism comprises a second adjusting lever, the second fixing structure comprises a second pivotal hole, and the second adjusting lever is penetrated through the second pivotal hole to be moved or rotated.

10. The illumination system according to claim 1, further comprising a covering member, wherein the covering member comprises a lateral plate with plural perforations, wherein the first adjusting mechanism, the second adjusting mechanism and the auxiliary fixing element are penetrated through the corresponding perforations of the lateral plate and exposed to an outer surface of the lateral plate.

* * * * *